R. P. P. DAGRON.
Microscope.
No. 33,031.
Patented Aug. 13, 1861.
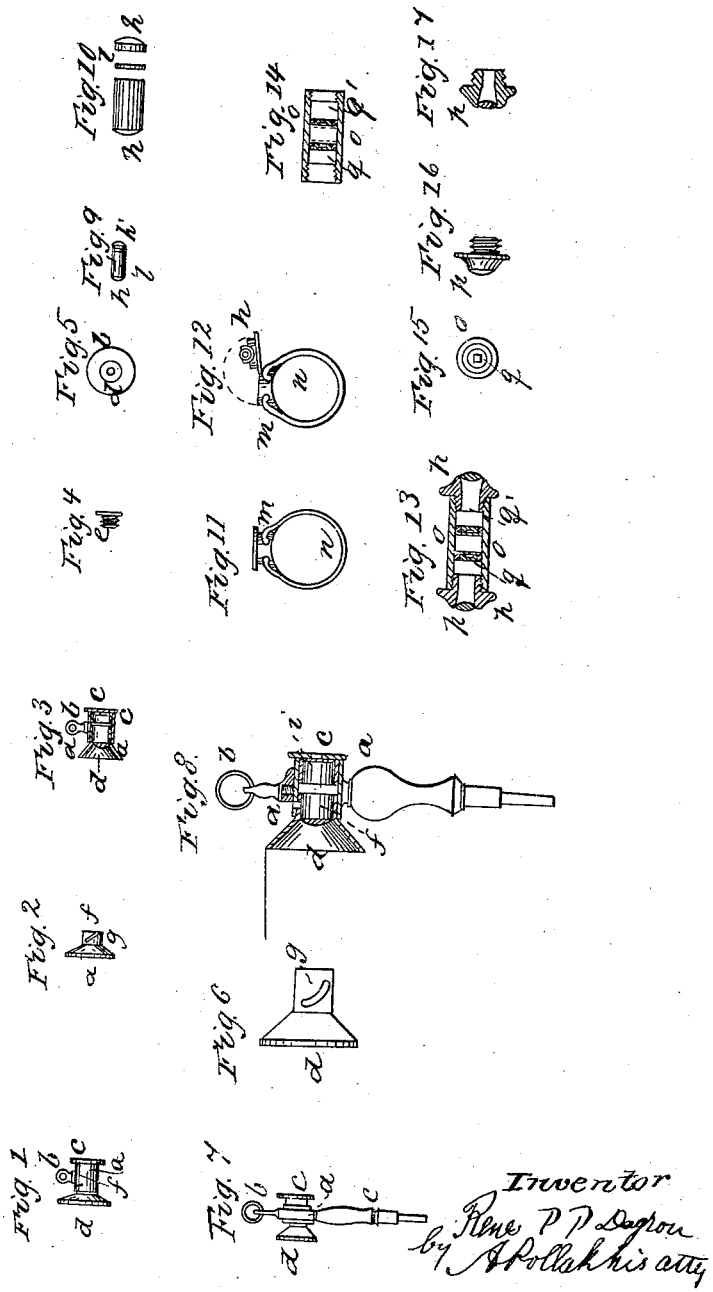

UNITED STATES PATENT OFFICE.

RENÉ P. P. DAGRON, OF PARIS, FRANCE.

PORTABLE MICROSCOPE.

Specification of Letters Patent No. 33,031, dated August 13, 1861.

*To all whom it may concern:*

Be it known that I, R. P. P. DAGRON, of Paris, in the Empire of France, have invented certain new and useful improvements in portable microscopes to be used for exhibiting photographic views and productions or descriptions of all kinds and constituting a new article of manufacture; and I do hereby declare that the following is a full, clear, and exact description thereof, reference being had to the accompanying drawing.

And my invention relates to a new combination or arrangement of the parts of a microscope whereby the same may be reduced to a minimum of volume without affecting its power and so that observations of microscopic pictures, insects, flowers, etc. may be made at pleasure. By the said arrangement I have succeeded in making a microscope of so small a volume that they can be combined with rings, watch-keys, pencil-holders etc. or may constitute, by themselves, charms or other articles of jewelry. Such microscope may also answer a useful purpose, as for instance, by combining one containing a microscopic calendar interest-table or other commercial memoranda with a pencil-holder or other article of jewelry that are generally worn or carried about.

Whether this microscope be used or not with any other article, its essential and characteristic feature consists in the permanence of the object constituting an integral part thereof although capable of being changed. These microscopes may be made in two ways; either with or without a metallic mounting; they may also be made with two objects so that an observation may be made at either end of the instrument and presenting two distinct subjects.

In the accompanying drawing, Figures 1, 2, 3, 4, 5, and 6 represent views of an adjustable or sliding microscope which may be used as a charm or combined with a watch-key as shown in Figs. 7 and 8. The views are purposely exaggerated in order that the details of construction may be more readily understood.

In said figures (*a*) is an outer cylinder closed at one extremity by a centrally perforated cap (*c*) and provided with a ring or hook (*b*) for attachment to a chain or other object.

The microscope proper is composed of a lens case (*d*) which may be made to slide within the outer cylinder or sleeve (*a*) by means of a projecting stud (*f*) playing within or fitting a helical groove (*g*) in the sleeve. It is obvious that by giving a slight rotation to the lens case the latter may be adjusted to its proper focus. The object is held by two tubes that incase the glass (*i*) upon which it is fixed. Another lens may be inserted between the eyepiece and the object glass or the glasses may be made achromatic, and plain on one side and convex on the other.

Figs. 9 and 11 represent a jewel microscope in its simplest form it consisting of a plain glass cylinder with convex extremities. Fig. 10 shows a magnified view of its integral parts; the part (*h*) forms the eyepiece and the part (*h′*) the object glass. Between these two is inserted the object (*l*) by fixing it with suitable adhesive substance against the internal face of the objective (*h′*) by then uniting the eyepiece with the object glass. In Figs. 11 and 12 is represented an application of this kind of microscope to a ring (*n*) in which the bezel (*m*) is hinged to its frame and is provided at its interior with a microscope (*h*) as shown. Fig. 13 represents a sectional elevation on an enlarged scale, of a microscope with two objects. (For details see Figs. 14, 15, 16 and 17.)

This instrument is composed of a cylinder (*o*) having at each end an eye piece (*p* and *p′*). The glasses *q* and *q′*, set in the interior of the cylinder at suitable distance from each other, contain different objects so that the visual rays may pass around the one object to illuminate the other.

Having thus described my invention and the manner in which the same is or may be carried into effect, I claim—

As a new article of manufacture, the jewel microscope substantially as herein described; the same consisting of a portable microscope with one or two objects and whether combined or not with articles of jewelry or other objects and in which the object or objects form an integral part thereof.

In testimony whereof I have signed my name to this specification before two subscribing witnesses.

R. P. P. DAGRON.

Witnesses:
 GEO. HUTTON,
 L. CLAIZ.